United States Patent [19]

Betsill et al.

[11] Patent Number: 5,088,207

[45] Date of Patent: Feb. 18, 1992

[54] TRUE END-TO-END ELECTRONIC SADDLE MICROMETER

[76] Inventors: Harry E. Betsill, 28 Cherrywood Ct., Cockeysville, Md. 21030; Bruce E. Bresnick, 6009 Mannington Ave., Baltimore, Md. 21206

[21] Appl. No.: 450,175

[22] Filed: Dec. 13, 1989

[51] Int. Cl.[5] .................... G01B 5/10; G01B 7/12
[52] U.S. Cl. .................... 33/555.3; 33/783; 33/806; 33/1 BB
[58] Field of Search .......... 33/555.1, 555.2, 555.3, 33/783, 784, 806, 807, 778, 1 BB

[56] References Cited

U.S. PATENT DOCUMENTS

| | | | |
|---|---|---|---|
| 3,104,472 | 9/1963 | Eppler | 33/555.1 |
| 3,169,323 | 2/1965 | Hold | 33/555.3 |
| 3,648,377 | 3/1972 | Witzke | 33/174 |
| 4,084,324 | 4/1978 | Whitehouse | 33/174 |
| 4,141,149 | 2/1979 | George et al. | 33/178 |
| 4,160,329 | 7/1979 | Scrimshaw | 33/178 |
| 4,175,331 | 11/1979 | Johnson | 33/172 |
| 4,181,958 | 1/1980 | Juengel et al. | 364/560 |
| 4,193,199 | 3/1980 | Whiteley et al. | 33/1 |
| 4,231,158 | 11/1980 | Possati | 33/149 |
| 4,473,951 | 10/1984 | Golinelli et al. | 33/143 |
| 4,543,725 | 10/1985 | Golinelli et al. | 33/178 |
| 4,562,735 | 1/1986 | Krippner et al. | 73/432 |
| 4,587,739 | 5/1986 | Holcomb et al. | 33/143 |
| 4,596,076 | 6/1986 | Sigg | 33/555.1 |
| 4,700,484 | 10/1987 | Frank et al. | 33/555.1 |
| 4,722,142 | 2/1988 | Schmidt | 33/169 |

FOREIGN PATENT DOCUMENTS 2307824 10/1974 Fed. Rep. of Germany.
2088062 6/1982 United Kingdom.

OTHER PUBLICATIONS

Roll Cal brochure (attached) (date unknown).
Farrell brochure (attached) (date unknown).
Voith brochure (attached) (date unknown).
Roll Profile Recorder brochure (attached) (date unknown).
FMT Equipment brochure (attached) (date unknown).
Mitutoyo catalog, p. 483 (attached) (date unknown).
Goodwin, L., A Differential Transformer Guage for Outside and Inside Diameter of Long Tubes, Jan. 1958 (attached).

*Primary Examiner*—William A. Cuchlinski, Jr.
*Assistant Examiner*—Alvin Wirthlin
*Attorney, Agent, or Firm*—Semmes, Bowen & Semmes

[57] ABSTRACT

An electronic saddle micrometer to measure the differential diameter and the profile of cylindrical rolls used in flat rolled product mills, which permits continuous and accurate measurement and recording of profile data over the entire length of the roll without repositioning the measuring arm assembly, by means of a dual set of measuring arm assemblies, one at each end of the saddle.

36 Claims, 6 Drawing Sheets

5,088,207

TRUE END-TO-END ELECTRONIC SADDLE MICROMETER

TECHNICAL FIELD OF THE INVENTION

This invention has its most important application to measuring, recording, and plotting the profile of cylindrical rolls used in flat rolled product mills.

BACKGROUND OF THE INVENTION

In order to obtain a flat rolled product, it is necessary that the cylindrical rolls used to roll the product have a particular profile, generally having a slight crown in the center and a slight taper towards the ends. It is therefore important to be able to accurately measure and record the variations in the diameter of the roll from one end to the other. Since at least the mid-1930's, saddle micrometers have been used to measure the profile of rolls for flat rolled products. A typical saddle micrometer consists of a wheeled saddle with arms extending down either side of the roll, with a counterweight/follower probe on one arm and a measuring device on the other, so that the saddle can be skated along the roll and differential measurements can be taken across the diameter of the roll where needed.

In recent years, saddle micrometers have been augmented with electrical measurement devices. The mechanical micrometer probe has been replaced with a distance transducer which allows measurement of changes in the roll diameter electronically. The data is processed to calculate location and magnitude of the maximum and minimum diameter of the roll and of the taper and crown of the roll's profile.

Notwithstanding these improvements, all saddle micrometers, from the 1930's to the present, have suffered from a major problem—the measuring arms cannot record diameter at the extreme ends of the rolls because the skate will fall off the roll. Saddle micrometers currently in use attempt to avoid this problem by attaching the measuring arm assembly so that it can slide from one end of the saddle to the other. (See, e.g., West German Patent No. 2,307,824). For example, when the saddle micrometer is at the far left end of the roll, the measuring arm assembly is slid to the far left side of the saddle, so that a measurement can be taken across the diameter of the far left end of the roll. At some point as the micrometer is skated along toward the right end of the roll, the measuring arm assembly is held stable and the saddle is moved underneath the measuring arm assembly so that the measuring arm assembly winds up on the far right side of the saddle, so that when the micrometer reaches the far right end of the roll, a measurement can be taken across the diameter of the far right end of the roll.

This readjustment procedure is unsatisfactory because the accuracy and repeatability of the measurements depend on the care and skill of the operator. The operator must hold the measuring arms stable relative to the roll while moving the saddle underneath the measuring arms. This readjustment can be extremely difficult, particularly on larger rolls, where the skate may be difficult to reach and, due to its size, may be hard to handle. This process is subject to error because the measuring arms are inevitably moved to a slightly different place on the roll. Moreover, there are minor changes in the perpendicularity of the measuring arm assembly to the center line of the roll, which usually results in an irregularity in the recording of the roll profile. This irregularity can result in inaccurate calculations of vital measurements, such as the location of the true crown of the roll and the profile of the roll. Although these inaccuracies are slight, modern quality control standards require that the roll profile be extremely accurate to permit production of large sheets of flat rolled product with a highly uniform, predetermined thickness. In addition to the inaccuracy created by repositioning the measuring arm assembly, this readjustment is time consuming.

This invention responds to the long-felt need for a device which permits a true end-to-end measurement and accurate profile of a roll and which can be taken in a minimum amount of time by an operator with little or no special training.

SUMMARY OF THE INVENTION

The true end-to-end saddle micrometer described herein utilizes two sets of measuring arms, one at either end of the saddle, rather than one set of measuring arms which slides from one end of the saddle to the other. By positioning the two arms beyond the center line of wheels of the saddle, two independent measurements of the profile can be taken in a single traverse of the roll face. The profiles are offset by the distance between the two sets of measuring arms. This distance is known and controlled, and the two curves are mathematically combined into a single representation of the roll face profile, providing an accurate depiction of the roll face profile from one end to the other.

DESCRIPTION OF EXEMPLARY FORMS OF THE INVENTION SHOWN IN THE DRAWINGS

Figure 1:
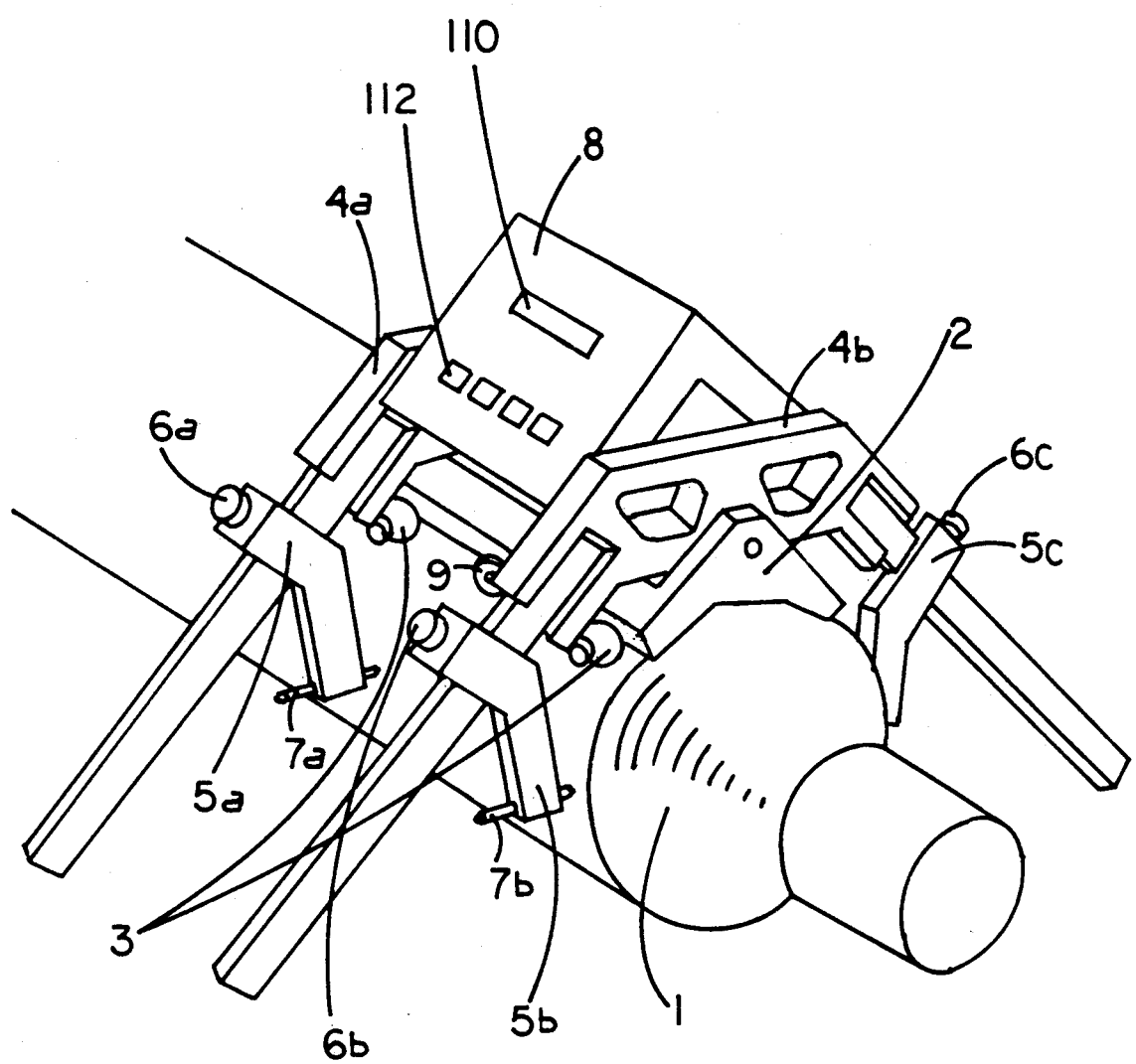
FIG. 1 shows the invention positioned on a roll to be measured (1). The invention includes a saddle (2) which skates along the roll (1) on precision wheels (3). Mounted at either end of the saddle are the two sets of measuring arms (4a and 4b) with elongated members projecting diagonally downward on either side of the roll (1). Attached to the measuring arms are probe holders (5a and 5b) which can be adjusted up and down along the measuring arms and fixed in position by means of top screws (6a and 6b), and attached to the measuring arms are probes (7a and 7b) which may be adjusted so that they are in a horizontal plane across the diameter of the roll. Mounted between the measuring arm assemblies is the electronic unit (8) which stores and processes the data from the probes (7a and 7b). The key pad (112) and LCD module (110) are located on the electronic unit (8). On one side, mounted in line with the precision wheels is a drive wheel (9) for an optical shaft encoder, which is used to measure distance along the roll (1).
Figure 2:
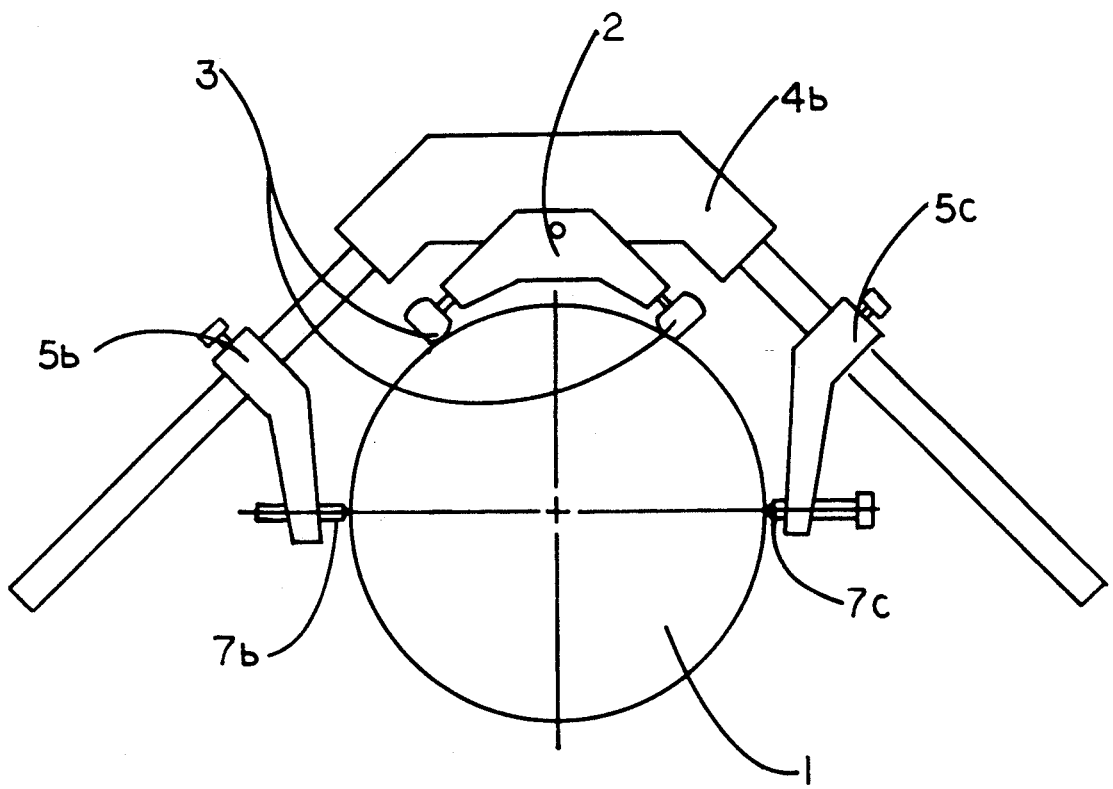
FIG. 2 depicts an end view of the invention, showing a cross section of the roll (1) being measured across its horizontal diameter by opposing probes, one of which is a distance transducer (7b) which measures variations in the diameter of the roll, and the other being a counterweight/follower probe (7c) which remains stable relative to the differential distance transducer (7b).

As shown in the drawings, the preferred form of the invention comprises a saddle with four precision wheels and two measuring arm assemblies, one at each end of the saddle. The measuring arms are fixed perpendicular to the axis of the roll, but are free to rotate within a vertical plane perpendicular to the axis of the roll. The electronic unit is mounted in the middle of the saddle, with a measuring arm assembly on either side.

Figure 3:
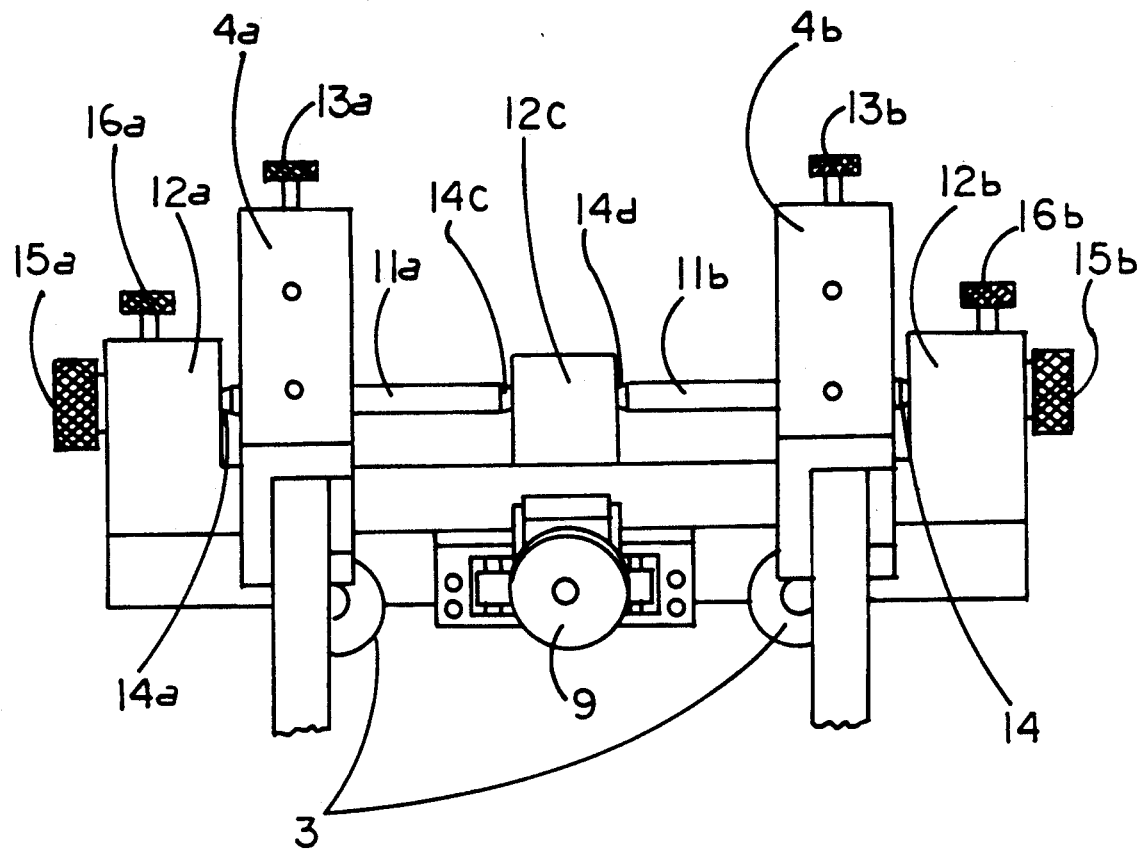
FIG. 3 depicts a side view of the invention with the electronic unit removed, showing the manner in which the measuring arm assemblies are each supported by a pintle (11a and 11b), which pintles are held by vertical supports (12a, 12b, 12c). The measuring arm assemblies are firmly affixed to the pintles by means of top screws (13a and 13b), and do not move relative to the pintles. The pintles are held in place by adjustable bearing centers (14a and 14b) at the far ends and by fixed bearing centers (14c and 14d) on the center vertical support (12c). End screws (15a and 15b) allow adjustment of the adjustable bearing centers to permit the pintles to rotate freely without endplay. The end screws (15a and 15b) are secured by top locking screws (16a and 16b).
Figure 3A:
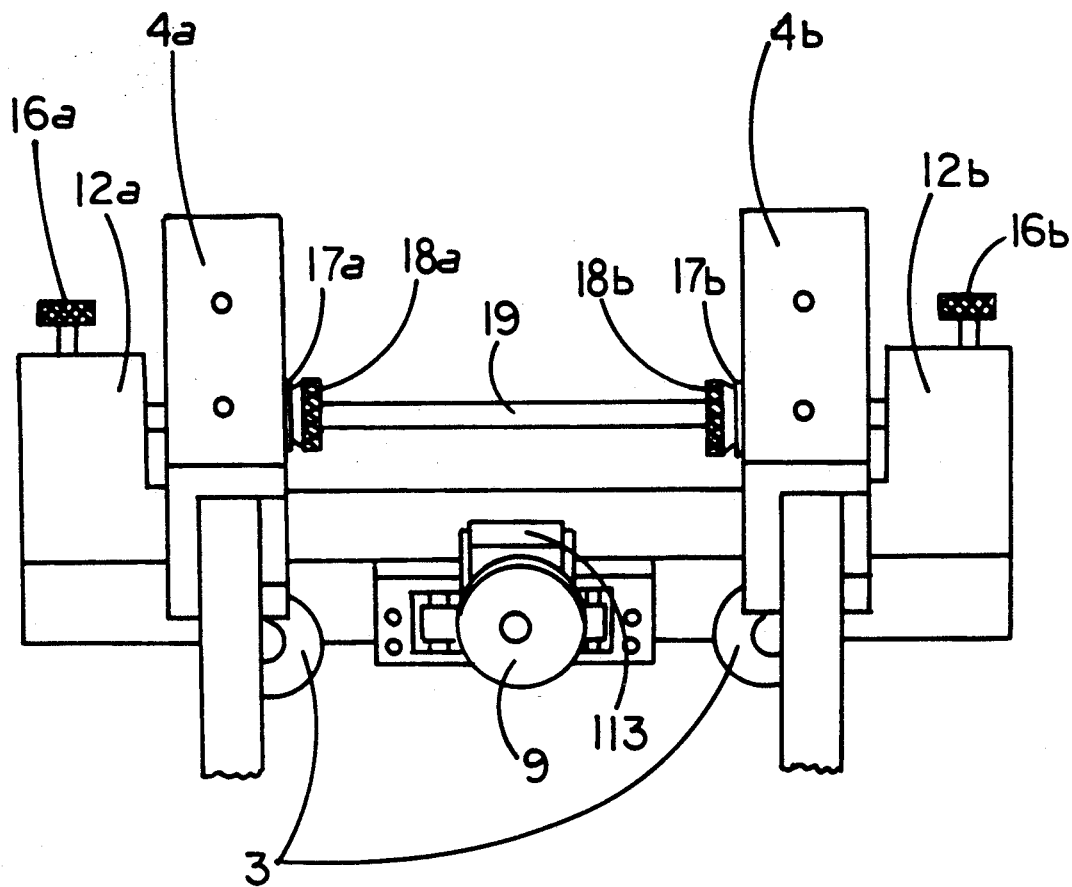
FIG. 3a depicts an alternate form of the invention wherein the two measuring arm assemblies (4a and 4b) are pivotally attached preferably by means of bearings (17a and 17b) and collars (18a and 18b) to a single rod (19) which extends from one end of the saddle to the other.

The measuring arm assemblies are held in place by pintles, one for each measuring arm assembly, and the two pintles are supported by three vertical members, one at each end of the saddle, and one in the center of the saddle, as best shown in FIG. 3. Alternatively, the measuring arm assembly may be held in place by a rod extending from one end of the saddle to the other with the measuring arm assemblies at either end of the rod. Other means of affixing the measuring arm assembly are possible, so long as the measuring arm assemblies can rotate independently of one another in a vertical plane relative to the object to be measured, but not in a horizontal plane relative to the object to be measured.

The saddle assembly permits the measuring arms to be positioned well beyond the center line of the wheels. In a design utilizing a single set of measuring arms, this would have produced a problem in balance, but with the dual set of measuring arms, symmetry is maintained. Thus the distance transducers may be positioned close to the end of the roll face without the wheels rolling off the end of the roll.

Figure 4:
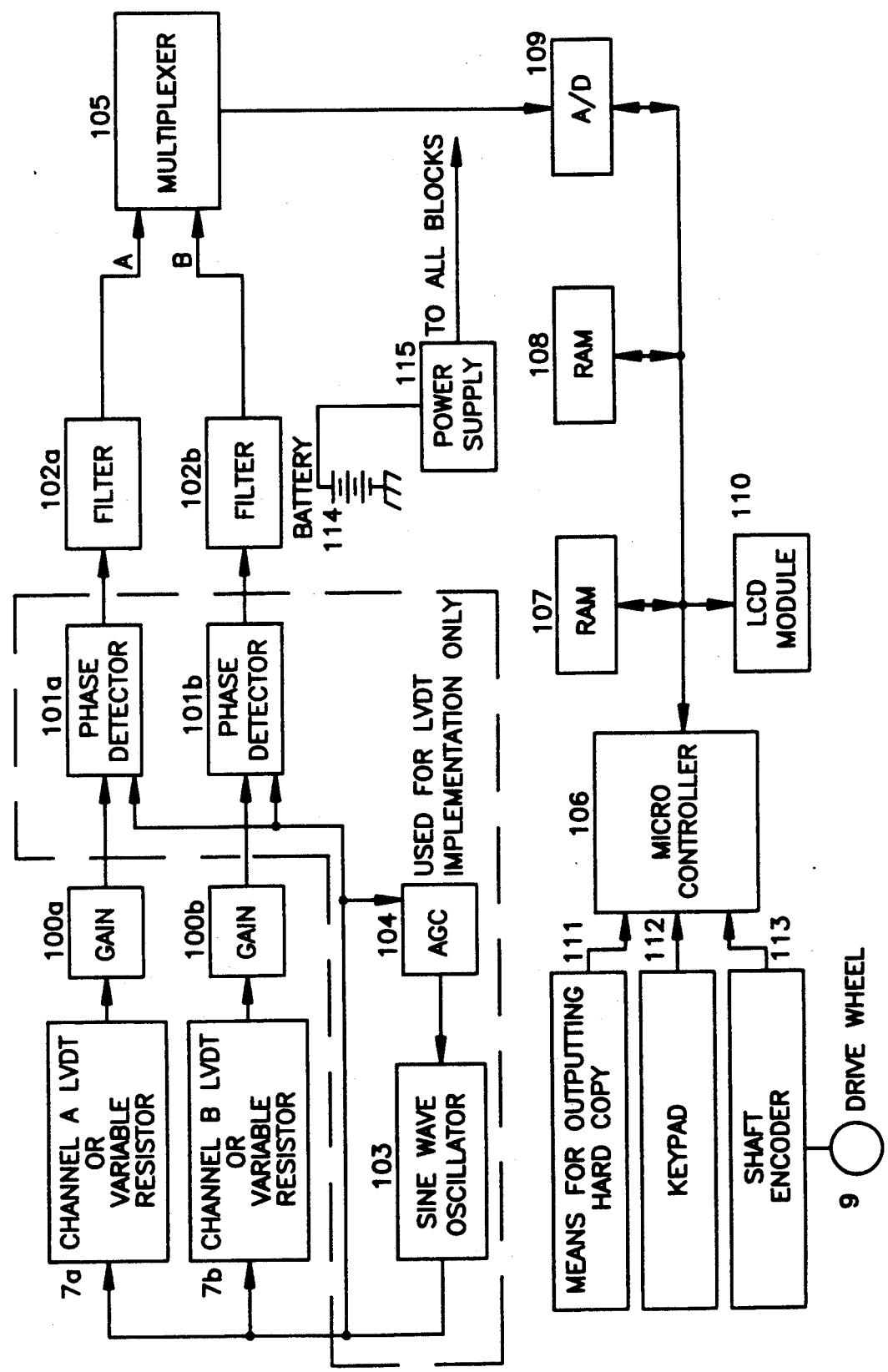
FIG. 4 is a functional diagram of the electronic components utilized in the invention further described below. The blocks inside the broken line (101a, 101b, 103 and 104) are used for LVDT implementation only.

The electronics unit depicted in FIG. 4 consists of a microcomputer (106) with data memory (RAM) (107) and program memory (ROM) (108), two distance transducers (7a and 7b) with appropriate drive and detection circuitry, a means for converting the analog signal from the distance transducer to digital output (generally a multiplexed (105) analog-to-digital converter (106)) an optical shaft encoder (113) with a mechanical drive wheel (9) which is used to measure distance along the roll, and a battery pack (114) or other power supply (115).

There are various types of distance transducers which could be used, but linear variable differential transformers (LVDTs) are generally preferred because of their response speed. LVDTs are well known in the art. A LVDT is driven by an AC signal, generally a sine wave oscillator (103) controlled by an automatic gain control circuit or AGC (104), and produces a signal, the phase and amplitude of which vary as the probe is moved. The signal from the LVDT is amplified by a gain device (100a and 100b) and processed through a phase detector (101a and 101b) which produces a rectified variable voltage signal which can be quantitized by an analog-to-digital converter (10a). Another possible type of distance transducer is a variable resistor producing a voltage signal which varies as the probe of the variable resistor is moved. This variable voltage signal, like the signal from the LVDT as demodulated by the phase detector 101a and 101b), can be quantitized by the analog-to-digital converter (109). Other types of distance transducers could be used without changing the essential character of the invention.

The analog-to-digital converter (109) is multiplexed (105) so that it can read a signal from both distance transducers (7a and 7b) essentially simultaneously. Utilizing a multiplexer avoids the need for two analog-to-digital converters (one for each distance transducer), so is less expensive and also eliminates the possibility of variation between analog-to-digital converters. The analog-to-digital converter (109) quantitizes the demodulated signal from the distance transducer into a binary code signal which can be read, processed and stored by the microcomputer (106).

As the saddle is skated along the roll, the optical shaft encoder's mechanical drive (generally a rubber tired wheel which rolls along the surface of the roll as depicted in FIG. 1, at g) turns, providing pulses to the microcomputer which are translated into measurements of the distance travelled along the length of the roll. At precise distances along the roll, the microcomputer reads the signal from the distance transducer as quantitized by the analog-to-digital converter. For short rolls, less than two hundred inches long the distance between measurements is typically 0.2 inches, and for longer rolls, 0.5 inches. These measurements are recorded and stored by the microcomputer.

Figure 5:
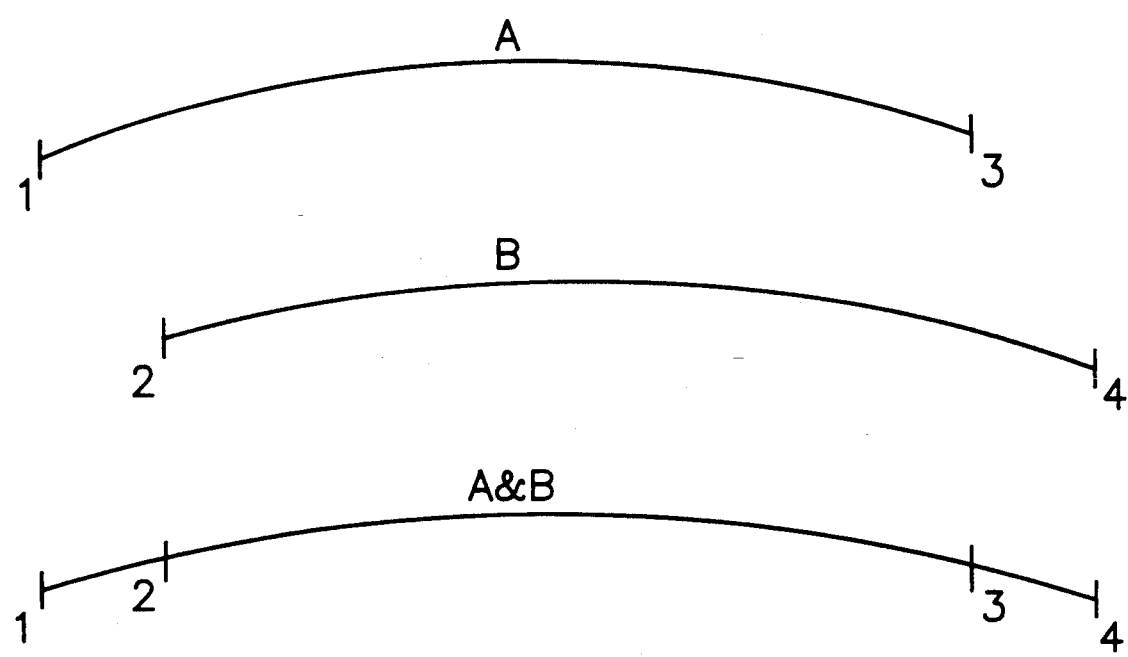
FIG. 5 depicts the curves produced by the distance transducer attached to each of the two measuring arm assemblies.

At the completion of the skate, the microcomputer will have recorded two curves offset by the distance between the measuring arm assemblies. These two offset curves are combined to produce a single curve describing the profile of the roll. As shown in FIG. 5, assuming that the saddle micrometer is skated from the left end of the roll to the right end of the roll, Curve A reflects the data received from the distance transducer on the left end of the saddle, and Curve B reflects the data received from the distance transducer on the right end of the saddle. Curve A and Curve B are reconciled into one curve reflecting the profile of the roll by an algorithm which uses Curve A from points 1 to 2, the average of Curves A and B between points 2 and 3, and Curve B from points 3 to 4.

The final result is a single curve reflecting the complete, end-to-end roll profile. From this curve, data manipulations such as trend line filtering can be employed to depict the overall shape of the roll. This curve is also used to calculate the location and magnitude of the critical parameters of the roll including minimum and maximum diameters, taper, and true crown.

All of the foregoing operations are automatic. The operator's only function is to align the saddle and push it from one end of the roll to the other. The possibility for human error is thus minimized.

We claim:

1. A true end-to-end electronic saddle micrometer for measuring the diameter of objects, particularly rolls used in flat rolled product mills, comprising:
   (a) a saddle with two ends;
   (b) wheels supporting the saddle;
   (c) two measuring arm assemblies attached to either end of the saddle, each measuring arm assembly having two elongated members projecting on opposite sides diagonally downward and outward from the saddle, said measuring arm assemblies being permitted to rotate independently within a vertical plane perpendicular to the axis of the object to be measured, but not within a horizontal plane;
   (d) four probe holders, one attached to each elongated member of the measuring arm assemblies, said probe holders being adjustable and able to be moved to and fixed at various points along the elongated members of the measuring arm assemblies;
   (e) two distance transducers, one attached to one of the probe holders affixed to one of the measuring arm assemblies and the other attached to one of the probe holders affixed to the other measuring arm assembly, which produce an analog signal;
   (f) two follower/counterweight probes, each affixed to one of the probe holders not holding a distance transducer, such that each follower/counterweight probe opposes one of the distance transducers;
   (g) a means for converting the analog signal from the distance transducers to digital output;
   (h) an optical shaft encoder with a mechanical drive for measuring distance along the length of the object to be measured, which optical shaft encoder is electronically connected to the microcomputer;
   (i) a microcomputer with a data and program memory and a communications interface electronically connected to the means for converting the analog signal from the distance transducer to digital output, and electronically connected to the optical shaft encoder, and capable of storing and then combining data from the first distance transducer to create a single curve reflecting the profile of the object to be measured so that at one end of the object to be measured, the measurement is taken by the first distance transducer, then over the central portion of the object to be measured, measurements are taken at the same points by both distance transducers, the measurement of the first distance transducer being averaged with the measurement of the second distance transducer, then at the other end of the object to be measured, measurement is taken by the second distance transducer;
   (j) a power supply.

2. The true end-to-end saddle micrometer of claim 1 wherein the two distance transducers are linear variable differential transformers, each of which is driven with an AC signal and is electronically connected to a phase detector which demodulates the signal from the linear variable differential transformers to create a rectified variable voltage signal which is electronically transmitted to the means for converting the analog signal from the distance transducer to digital output.

3. The true end-to-end saddle micrometer of claim 1 wherein the two differential distance transducers are variable resistors attached to probes which produce a voltage signal which varies as the probes are moved, which variable voltage signal is electronically transmitted to the means for converting the analog signal from the distance transducer to digital output.

4. The true end-to-end saddle micrometer of claim 1 wherein each of the two measuring arm assemblies is independently supported by a separate pintle permitting independent rotation of each measuring arm assembly within a vertical plane perpendicular to the axis of the object to be measured but not within a horizontal plane, each pintle being affixed to the saddle by means of a vertical support at the center and end of the saddle.

5. The true end-to-end saddle micrometer of claim 2 wherein each of the two measuring arm assemblies is independently supported by a separate pintle permitting independent rotation of each measuring arm assembly within a vertical plane perpendicular to the axis of the object to be measured but not within a horizontal plane, each pintle being affixed to the saddle by means of a vertical support at the center and end of the saddle.

6. The true end-to-end saddle micrometer of claim 3 wherein each of the two measuring arm assemblies is independently supported by a separate pintle permitting independent rotation of each measuring arm assembly within a vertical plane perpendicular to the axis of the object to be measured but not within a horizontal plane, each pintle being affixed to the saddle by means of a vertical support at the center and end of the saddle.

7. The true end-to-end saddle micrometer of claim 1 wherein the two measuring arm assemblies are attached to a single rod which extends from one end of the saddle to the other, and which rod is attached to vertical supports at either end of the saddle, such that the measuring arm assemblies can rotate independently of one another in a vertical plane perpendicular to the axis of the object being measured, but not in a horizontal plane.

8. The true end-to-end saddle micrometer of claim 2 wherein the two measuring arm assemblies are attached to a single rod which extends from one end of the saddle to the other, and which rod is attached to vertical supports at either end of the saddle, such that the measuring arm assemblies can rotate independently of one another in a vertical plane perpendicular to the axis of the object being measured, but not in a horizontal plane.

9. The true end-to-end saddle micrometer of claim 3 wherein the two measuring arm assemblies are attached to a single rod which extends from one end of the saddle to the other, and which rod is attached to vertical supports at either end of the saddle, such that the measuring arm assemblies can rotate independently of one another in a vertical plane perpendicular to the axis of the object being measured, but not in a horizontal plane.

10. The true end-to-end saddle micrometer of claim 1 wherein the microcomputer is attached to a means for outputting hard copy from the microcomputer in graphic form.

11. The true end-to-end saddle micrometer of claim 2 wherein the microcomputer is attached to a means for outputting hard copy from the microcomputer in graphic form.

12. The true end-to-end saddle micrometer of claim 3 wherein the microcomputer is attached to a means for outputting hard copy from the microcomputer in graphic form.

13. The true end-to-end saddle micrometer of claim 4 wherein the microcomputer is attached to a means for outputting hard copy from the microcomputer in graphic form.

14. The true end-to-end saddle micrometer of claim 5 wherein the microcomputer is attached to a means for outputting hard copy from the microcomputer in graphic form.

15. The true end-to-end saddle micrometer of claim 6 wherein the microcomputer is attached to a means for outputting hard copy from the microcomputer in graphic form.

16. The true end-to-end saddle micrometer of claim 7 wherein the microcomputer is attached to a means for outputting hard copy from the microcomputer in graphic form.

17. The true end-to-end saddle micrometer of claim 8 wherein the microcomputer is attached to a means for outputting hard copy from the microcomputer in graphic form.

18. The true end-to-end saddle micrometer of claim 9 wherein the microcomputer is attached to a means for outputting hard copy from the microcomputer in graphic form.

19. The true end-to-end saddle micrometer of claim 1 wherein the means for converting the analog signal from the distance transducer to digital output is a multiplexed analog-to-digital converter.

20. The true end-to-end saddle micrometer of claim 2 wherein the means for converting the analog signal from the distance transducer to digital output is a multiplexed analog-to-digital converter.

21. The true end-to-end saddle micrometer of claim 3 wherein the means for converting the analog signal from the distance transducer to digital output is a multiplexed analog-to-digital converter.

22. The true end-to-end saddle micrometer of claim 4 wherein the means for converting the analog signal from the distance transducer to digital output is a multiplexed analog-to-digital converter.

23. The true end-to-end saddle micrometer of claim 5 wherein the means for converting the analog signal from the distance transducer to digital output is a multiplexed analog-to-digital converter.

24. The true end-to-end saddle micrometer of claim 6 wherein the means for converting the analog signal from the distance transducer to digital output is a multiplexed analog-to-digital converter.

25. The true end-to-end saddle micrometer of claim 7 wherein the means for converting the analog signal from the distance transducer to digital output is a multiplexed analog-to-digital converter.

26. The true end-to-end saddle micrometer of claim 8 wherein the means for converting the analog signal from the distance transducer to digital output is a multiplexed analog-to-digital converter.

27. The true end-to-end saddle micrometer of claim 9 wherein the means for converting the analog signal from the distance transducer to digital output is a multiplexed analog-to-digital converter.

28. The true end-to-end saddle micrometer of claim 10 wherein the means for converting the analog signal from the distance transducer to digital output is a multiplexed analog-to-digital converter.

29. The true end-to-end saddle micrometer of claim 11 wherein the means for converting the analog signal from the distance transducer to digital output is a multiplexed analog-to-digital converter.

30. The true end-to-end saddle micrometer of claim 12 wherein the means for converting the analog signal from the distance transducer to digital output is a multiplexed analog-to-digital converter.

31. The true end-to-end saddle micrometer of claim 13 wherein the means for converting the analog signal from the distance transducer to digital output is a multiplexed analog-to-digital converter.

32. The true end-to-end saddle micrometer of claim 14 wherein the means for converting the analog signal from the distance transducer to digital output is a multiplexed analog-to-digital converter.

33. The true end-to-end saddle micrometer of claim 15 wherein the means for converting the analog signal from the distance transducer to digital output is a multiplexed analog-to-digital converter.

34. The true end-to-end saddle micrometer of claim 16 wherein the means for converting the analog signal from the distance transducer to digital output is a multiplexed analog-to-digital converter.

35. The true end-to-end saddle micrometer of claim 17 wherein the means for converting the analog signal from the distance transducer to digital output is a multiplexed analog-to-digital converter.

36. The true end-to-end saddle micrometer of claim 18 wherein the means for converting the analog signal from the distance transducer to digital output is a multiplexed analog-to-digital converter.

* * * * *